(12) United States Patent
Huston et al.

(10) Patent No.: US 12,190,342 B2
(45) Date of Patent: *Jan. 7, 2025

(54) SPECTATOR AND PARTICIPANT SYSTEM AND METHOD FOR DISPLAYING DIFFERENT VIEWS OF AN EVENT

(71) Applicant: Spatial Reality, LLC., Austin, TX (US)

(72) Inventors: Charles D. Huston, Austin, TX (US); Chris Coleman, Austin, TX (US)

(73) Assignee: Spatial Reality, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,130

(22) Filed: Aug. 9, 2021

(65) Prior Publication Data

US 2021/0374782 A1 Dec. 2, 2021

Related U.S. Application Data

(63) Continuation of application No. 16/668,143, filed on Oct. 30, 2019, now Pat. No. 11,087,345, which is a
(Continued)

(51) Int. Cl.
*G06Q 30/0207* (2023.01)
*A63B 69/36* (2006.01)
(Continued)

(52) U.S. Cl.
CPC ..... *G06Q 30/0207* (2013.01); *A63B 69/3658* (2013.01); *G06Q 30/0241* (2013.01);
(Continued)

(58) Field of Classification Search
None
See application file for complete search history.

(56) References Cited

U.S. PATENT DOCUMENTS 5,364,093 A   11/1994  Huston et al.
5,802,492 A    9/1998  DeLorme et al.
(Continued)

FOREIGN PATENT DOCUMENTS

EP    1077421    2/2001
EP    1113669    7/2001
(Continued)

OTHER PUBLICATIONS

US Patent and Trademark Office, Office Action for U.S. Appl. No. 11/875,414 dated Oct. 6, 2009, 12 pages ..
(Continued)

*Primary Examiner* — James A Thompson
(74) *Attorney, Agent, or Firm* — Egan, Enders & Huston LLP.

(57) ABSTRACT

A spectator system and method that displays different views of an event, such as a sporting event, and in particular uses a position selected by the spectator to assist in displaying a view from the selected position. The spectator, using an internet device can zoom, pan, tilt and change the view, as well as change the view to another position, such as a finish line, goal, or a participant position (e.g. Driver of car #3 or Tiger Wood's position). The starting viewing position can be specified, as well as the target position or orientation from the starting viewing position. Vital information on the sporting event or a participant can be appended to the view. In some forms, artificial reality or any geographic referenced datasets can be used and combined, such as 3D imagery or 3D renderings, to enhance the experience.

35 Claims, 8 Drawing Sheets

Related U.S. Application Data continuation of application No. 15/097,711, filed on Apr. 13, 2016, now Pat. No. 10,512,832, which is a continuation of application No. 14/037,642, filed on Sep. 26, 2013, now Pat. No. 9,498,694, which is a continuation of application No. 13/605,174, filed on Sep. 6, 2012, now Pat. No. 8,589,488, which is a continuation of application No. 13/182,930, filed on Jul. 14, 2011, now Pat. No. 8,933,967, and a continuation of application No. 13/152,476, filed on Jun. 3, 2011, now abandoned, said application No. 13/182,930 is a continuation-in-part of application No. 12/111,688, filed on Apr. 29, 2008, now Pat. No. 9,445,225, which is a continuation-in-part of application No. 11/875,414, filed on Oct. 19, 2007, now Pat. No. 8,249,626, which is a continuation-in-part of application No. 11/624,998, filed on Jan. 19, 2007, now Pat. No. 8,275,397, which is a continuation-in-part of application No. 11/456,723, filed on Jul. 11, 2006, now Pat. No. 7,518,501, and a continuation-in-part of application No. 11/456,715, filed on Jul. 11, 2006, now Pat. No. 7,855,638.

(60) Provisional application No. 60/699,205, filed on Jul. 14, 2005.

(51) Int. Cl.
| | |
|---|---|
| *G01S 19/19* | (2010.01) |
| *G06Q 30/0241* | (2023.01) |
| *G06Q 50/00* | (2024.01) |
| *G06T 19/00* | (2011.01) |
| *H04L 51/52* | (2022.01) |
| *H04L 67/52* | (2022.01) |
| *H04W 4/029* | (2018.01) |
| *H04W 4/21* | (2018.01) |
| *H04W 4/80* | (2018.01) |
| *H04W 12/06* | (2021.01) |

(52) U.S. Cl.
CPC ........... *G06Q 50/01* (2013.01); *G06T 19/006* (2013.01); *H04L 51/52* (2022.05); *H04L 67/52* (2022.05); *H04W 4/029* (2018.02); *H04W 4/21* (2018.02); *H04W 4/80* (2018.02); *H04W 12/06* (2013.01); *G01S 19/19* (2013.01)

(56) References Cited

U.S. PATENT DOCUMENTS

| | | | |
|---|---|---|---|
| 5,913,918 A | 6/1999 | Nakano et al. | |
| 6,115,177 A | 9/2000 | Vossler | |
| 6,166,679 A | 12/2000 | Lemelson et al. | |
| 6,195,090 B1 | 2/2001 | Riggins, III | |
| 6,199,015 B1 | 3/2001 | Curtwright et al. | |
| 6,304,211 B1 | 10/2001 | Boman | |
| 6,317,127 B1 | 11/2001 | Daily et al. | |
| 6,330,356 B1 | 12/2001 | Sundareswaran et al. | |
| 6,409,607 B1 | 6/2002 | Libit et al. | |
| 6,411,266 B1 | 6/2002 | Maguire, Jr. | |
| 6,452,544 B1 | 9/2002 | Hakala et al. | |
| 6,559,884 B1 | 5/2003 | Tamir et al. | |
| 6,578,203 B1 | 6/2003 | Anderson, Jr. et al. | |
| 6,618,593 B1 | 9/2003 | Drutman | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,868,338 B1 | 3/2005 | Elliott | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 6,920,328 B2 | 7/2005 | Wollrab | |
| 6,996,402 B2 | 2/2006 | Logan et al. | |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,123,215 B2 | 10/2006 | Nakada | |
| 7,209,035 B2 | 4/2007 | Tabankin et al. | |
| 7,317,705 B2 | 1/2008 | Hanson | |
| 7,353,034 B2 | 4/2008 | Haney | |
| 7,441,198 B2 | 10/2008 | Dempski et al. | |
| 7,518,501 B2 | 4/2009 | Huston | |
| 7,546,317 B1 | 6/2009 | Kaptelinin | |
| 7,593,687 B2 | 9/2009 | Anderson, Jr. et al. | |
| 7,716,283 B2 | 5/2010 | Thukral | |
| 7,812,766 B2 | 10/2010 | Leblanc et al. | |
| 7,855,638 B2 | 12/2010 | Huston | |
| 8,172,702 B2 | 5/2012 | Meadows et al. | |
| 8,275,397 B2 | 9/2012 | Huston | |
| 9,445,225 B2 * | 9/2016 | Huston | H04W 4/02 |
| 9,597,576 B2 | 3/2017 | Peterson et al. | |
| 11,087,345 B2 | 8/2021 | Huston et al. | |
| 2002/0038178 A1 | 3/2002 | Talkenberg et al. | |
| 2002/0094853 A1 | 7/2002 | Hayashi | |
| 2002/0154174 A1 | 10/2002 | Redlich et al. | |
| 2002/0188678 A1 | 12/2002 | Edecker et al. | |
| 2002/0196280 A1 | 12/2002 | Bassett et al. | |
| 2003/0032436 A1 | 2/2003 | Mikuni | |
| 2003/0038892 A1 | 2/2003 | Wang et al. | |
| 2003/0109322 A1 | 6/2003 | Funk et al. | |
| 2003/0149496 A1 | 8/2003 | Johnson | |
| 2003/0156134 A1 | 8/2003 | Kim | |
| 2003/0174178 A1 | 9/2003 | Hodges | |
| 2003/0187730 A1 | 10/2003 | Natarajan et al. | |
| 2003/0189589 A1 | 10/2003 | LeBlanc et al. | |
| 2003/0194685 A1 | 10/2003 | Adams | |
| 2003/0210228 A1 | 11/2003 | Ebersole et al. | |
| 2004/0036622 A1 | 2/2004 | Dukach et al. | |
| 2004/0051680 A1 | 3/2004 | Azuma et al. | |
| 2004/0104935 A1 | 6/2004 | Williamson et al. | |
| 2004/0147329 A1 | 7/2004 | Meadows et al. | |
| 2004/0152058 A1 | 8/2004 | Browne | |
| 2004/0161246 A1 | 8/2004 | Matsushita et al. | |
| 2005/0227791 A1 | 3/2005 | McCreary et al. | |
| 2005/0078195 A1 | 4/2005 | VanWagner | |
| 2005/0107952 A1 | 5/2005 | Hoshino et al. | |
| 2005/0143096 A1 | 6/2005 | Boesch | |
| 2005/0148388 A1 | 7/2005 | Vayra et al. | |
| 2005/0207617 A1 | 9/2005 | Sarnoff | |
| 2005/0250458 A1 | 11/2005 | Graham et al. | |
| 2005/0259002 A1 | 11/2005 | Erario et al. | |
| 2006/0015923 A1 | 1/2006 | Chuah et al. | |
| 2006/0075445 A1 | 4/2006 | O'Kane | |
| 2006/0104600 A1 | 5/2006 | Abrams | |
| 2006/0105857 A1 | 5/2006 | Stark | |
| 2006/0136173 A1 | 6/2006 | Case et al. | |
| 2006/0195361 A1 | 8/2006 | Rosenberg | |
| 2006/0262140 A1 | 11/2006 | Kujawa et al. | |
| 2006/0284791 A1 | 12/2006 | Chen et al. | |
| 2007/0024527 A1 | 2/2007 | Heikkinen et al. | |
| 2007/0060408 A1 | 3/2007 | Schultz et al. | |
| 2007/0103292 A1 | 5/2007 | Burkley et al. | |
| 2007/0117576 A1 * | 5/2007 | Huston | G06Q 50/01 455/461 |
| 2007/0150444 A1 | 6/2007 | Chesnais et al. | |
| 2007/0174183 A1 | 7/2007 | Jung et al. | |
| 2007/0179792 A1 | 8/2007 | Kramer | |
| 2007/0191020 A1 | 8/2007 | Fischer et al. | |
| 2007/0242131 A1 | 10/2007 | Sanz-Pastor et al. | |
| 2007/0255831 A1 | 11/2007 | Hayashi et al. | |
| 2007/0265089 A1 | 11/2007 | Robarts et al. | |
| 2007/0282688 A1 | 12/2007 | Buhrow et al. | |
| 2008/0163379 A1 | 7/2008 | Robinson | |
| 2008/0194323 A1 | 8/2008 | Merkli et al. | |
| 2008/0293443 A1 | 11/2008 | Pettinato | |
| 2009/0054084 A1 | 2/2009 | Buhrke et al. | |
| 2009/0089162 A1 | 4/2009 | Davis et al. | |
| 2009/0091583 A1 | 4/2009 | McCoy | |

(56) References Cited

U.S. PATENT DOCUMENTS

| | | |
|---|---|---|
| 2009/0094106 A1 | 4/2009 | Porter et al. |
| 2009/0102859 A1 | 4/2009 | Athsani et al. |
| 2009/0147070 A1 | 6/2009 | Marathe et al. |
| 2009/0300520 A1 | 12/2009 | Ashutosh et al. |
| 2010/0081520 A1* | 4/2010 | Peterson ............ A63B 69/3658 473/409 |
| 2011/0154223 A1 | 6/2011 | Whitnah et al. |
| 2011/0157180 A1 | 6/2011 | Burger et al. |
| 2011/0191141 A1 | 8/2011 | Thompson et al. |
| 2011/0230986 A1 | 9/2011 | Lafortune et al. |
| 2011/0288914 A1 | 11/2011 | Guthrie |
| 2011/0305369 A1 | 12/2011 | Bentley et al. |
| 2012/0111688 A1 | 5/2012 | Komai et al. |
| 2012/0146907 A1 | 6/2012 | Viju |
| 2013/0182914 A1 | 7/2013 | Sakai et al. |
| 2013/0182930 A1 | 7/2013 | Trzasko et al. |
| 2013/0188030 A1 | 7/2013 | Igarashi |
| 2014/0037642 A1 | 2/2014 | McCafferty et al. |

FOREIGN PATENT DOCUMENTS

| | | |
|---|---|---|
| EP | 1262213 | 12/2002 |
| JP | 10-154242 | 6/1998 |
| KR | 10-2004-0047692 | 6/2004 |
| KR | 10-2005-0055506 | 6/2005 |
| WO | 01/05476 | 1/2001 |
| WO | 01/36061 | 5/2001 |

OTHER PUBLICATIONS

US Patent and Trademark Office, Office Action for U.S. Appl. No. 14/486,480 dated Sep. 24, 2015, 28 pages.
US Patent and Trademark Office, Office Action for U.S. Appl. No. 11/624,998 dated Sep. 1, 2010, 16 pages.
US Patent and Trademark Office, Office Action for U.S. Appl. No. 13/182,930 dated Sep. 10, 2012, 18 pages.
US Patent and Trademark Office, Office Action for U.S. Appl. No. 13/182,930 dated Sep. 25, 2013, 22 pages.
O'Malley et al., "Human Activity Tracking for Wide-Area Surveillance," University of Florida, Department of Electrical and Computer Engineering, May 2002, 7 pages.
Chung et al., "My Second Bike: A TV-enables social and interactive riding experience," IEEE CCNC 2010, Feb. 2010, 5 pages.
Bolter et al., "Is it Live or is it AR?", IEEE Spectrum, Jul. 31, 2007, 5 pages.
Falchuk, "Visual and Interaction Design Themes in Mobile Healthcare," 2009 6th Annual International Mobile and Ubiquitous Systems: Networking & Services, Jul. 2009, 10 pages.
Cheok et al., "Capture the Flag: Mixed-Reality Social Gaming with Smart Phones," IEEE Pervasice Computing, vol. 5, No. 2, Apr. 2006, 8 pages.
US Patent and Trademark Office, Office Action for U.S. Appl. No. 16/668,143 dated Dec. 2, 2019, 22 pages.
US Patent and Trademark Office, Office Action for U.S. Appl. No. 16/668,143 dated Jun. 15, 2020, 42 pages.
US Patent and Trademark Office, Office Action for U.S. Appl. No. 16/668,143 dated Dec. 7, 2020, 21 pages.
Barstow et al., "Personalized Interactive Real-Time Sports Reporting Using Java," American Programmer, Jan. 1997, pp. 32-37.
Final Office Action mailed Apr. 8, 2013 for U.S. Appl. No. 13/182,930.
Final Office Action mailed Dec. 28, 2009 for U.S. Appl. No. 11/456,715.
Final Office Action mailed Feb. 6, 2013 for U.S. Appl. No. 13/423,423.
Final Office Action mailed Jul. 24, 2012 for U.S. Appl. No. 12/111,688.
Final Office Action mailed Jun. 13, 2011 for U.S. Appl. No. 12/146,907.
Final Office Action mailed Jun. 22, 2010 for U.S. Appl. No. 11/875,414.
Final Office Action mailed Jun. 30, 2014 for U.S. Appl. No. 13/182,930.
Final Office Action mailed Jun. 9, 2011 for U.S. Appl. No. 11/875,414.
Final Office Action mailed Nov. 23, 2016 for U.S. Appl. No. 14/247,694.
Final Office Action mailed Nov. 7, 2011 for U.S. Appl. No. 11/624,998.
Final Office Action mailed Oct. 1, 2008 for U.S. Appl. No. 11/456,723.
Final Office Action mailed Oct. 28, 2014 for U.S. Appl. No. 13/182,914.
Final Office Action mailed Sep. 9, 2015 for U.S. Appl. No. 12/111,688.
Final Office Action mailed Sep. 9, 2015 for U.S. Appl. No. 13/182,914.
Final Office Action mailed Sep. 30, 2013 for U.S. Appl. No. 13/182,914.
International Search Report, PCT/US2006/027218, mailed Feb. 12, 2007.
Notice of Allowance mailed Aug. 30, 2016 for U.S. Appl. No. 14/037,642.
Notice of Allowance mailed Aug. 6, 2013 for U.S. Appl. No. 13/605,174.
Notice of Allowance mailed Dec. 14, 2016 for U.S. Appl. No. 14/486,480.
Notice of Allowance mailed Mar. 9, 2012 for U.S. Appl. No. 12/146,907.
Notice of Allowance mailed May 8, 2014 for U.S. Appl. No. 13/423,423.
Notice of Allowance mailed Oct. 4, 2010 for U.S. Appl. No. 11/456,715.
Notice of Allowance mailed Sep. 18, 2017 for U.S. Appl. No. 14/247,694.
Office Action mailed Apr. 14, 2009 for U.S. Appl. No. 11/456,715.
Office Action mailed Apr. 14, 2010 for U.S. Appl. No. 11/624,998.
Office Action mailed Apr. 17, 2008 for U.S. Appl. No. 11/456,723.
Office Action mailed Aug. 7, 2015 for U.S. Appl. No. 14/037,642.
Office Action mailed Aug. 2, 2013 for U.S. Appl. No. 12/111,688.
Office Action mailed Aug. 20, 2013 for U.S. Appl. No. 13/423,423.
Office Action mailed Aug. 29, 2012 for U.S. Appl. No. 13/188,030.
Office Action mailed Aug. 8, 2011 for U.S. Appl. No. 12/111,688.
Office Action mailed Dec. 16, 2014 for U.S. Appl. No. 12/111,688.
Office Action mailed Dec. 21, 2010 for U.S. Appl. No. 11/875,414.
Office Action mailed Feb. 12, 2013 for EP Patent Application No. 06787161.6.
Office Action mailed Feb. 15, 2011 for U.S. Appl. No. 11/624,998.
Office Action mailed Feb. 23, 2017 for U.S. Appl. No. 14/247,694.
Office Action mailed Jan. 22, 2015 for U.S. Appl. No. 13/182,914.
Office Action mailed Jan. 3, 2012 for U.S. Appl. No. 13/188,030.
Office Action mailed Jan. 4, 2012 for U.S. Appl. No. 12/146,907.
Office Action mailed Jul. 12, 2017 for U.S. Appl. No. 15/097,711.
Office Action mailed Jun. 14, 2011 for U.S. Appl. No. 11/624,998.
Office Action mailed Mar. 16, 2010 for U.S. Appl. No. 11/456,715.
Office Action mailed Mar. 19, 2014 for U.S. Appl. No. 13/182,914.
Office Action mailed Mar. 27, 2012 for U.S. Appl. No. 11/875,414.
Office Action mailed Mar. 4, 2011 for U.S. Appl. No. 12/146,907.
Office Action mailed Mar. 7, 2013 for U.S. Appl. No. 13/182,914.
Office Action mailed May 26, 2016 for U.S. Appl. No. 14/247,694.
Office Action mailed Nov. 22, 2012 for KR Patent Application No. 10-2008-7003027.
Office Action mailed Oct. 6, 2009 for U.S. Appl. No. 11/624,998.

* cited by examiner

SPECTATOR AND PARTICIPANT SYSTEM AND METHOD FOR DISPLAYING DIFFERENT VIEWS OF AN EVENT

This application is a continuation of U.S. patent application Ser. No. 16/668,143, filed Oct. 30, 2019, which is a continuation of U.S. patent application Ser. No. 15/097,711, filed Apr. 13, 2016, which is a continuation of U.S. patent application No. 14/037,642 (now U.S. Pat. No. 9,498,694) filed Sep. 26, 2013, which is a continuation of U.S. patent application Ser. No. 13/605,174 (now U.S. Pat. No. 8,589,488) filed Sep. 6, 2012 which is a continuation of U.S. patent application Ser. No. 13/182,930 (now U.S. Pat. No. 8,933,967) filed Jul. 14, 2011 and Ser. No. 13/152,476 filed Jun. 3, 2011. Application '930 is a continuation-in-part of U.S. patent application Ser. No. 12/111,688 (now U.S. Pat. No. 9,445,225) filed Apr. 29, 2008 which is a continuation-in-part of U.S. patent application Ser. No. 11/875,414 (now U.S. Pat. No. 8,249,626) filed Oct. 19, 2007 which is a continuation-in-part of U.S. patent application Ser. No. 11/624,998 (now U.S. Pat. No. 8,275,397) filed Jan. 19, 2007 which is a continuation-in-part of U.S. patent application Ser. No. 11/456,715 (now U.S. Pat. No. 7,855,638) and Ser. No. 11/456,723 (now U.S. Pat. No. 7,518,501) filed Jul. 11, 2006 both of which claim priority to U.S. Provisional Application No. 60/699,205 filed Jul. 14, 2005 (sometimes referred to collectively as "related applications" herein). All of which are incorporated herein by reference, and the benefit of 35 U.S.C. § 120 is claimed.

BACKGROUND

1. Field of the Invention

This invention relates generally to a spectator sport system and method that displays different views of the event and, in particular, utilizes a user's selected source position to assist in displaying information about the target.

2. Description of Related Art

GPS systems have been used as navigation systems to location destinations. GPS systems have also been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS systems are becoming much more accurate, inexpensive and robust. GPS antennas and engines are fairly inexpensive and accurate with WAAS to less than 2 meters. At a sporting arena, the accuracy of GPS can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications). Other radio technologies are also promising in many applications, such as Zigbee and Ultrawideband.

What has not been done in sports is an integrated GPS system for spectators to more fully enjoy a sport particularly at a remote location. For example, at a NASCAR race, the TV or radio viewing location limits his view of the race and is not his own unique perspective. While watching a race, the spectator might listen to a radio or watch a portable TV, but the perspective is the announcer's or TV angle. Such divergent perspectives—announcer versus personal—can be confusing. Further, a remote spectator might be most interested in the cars he is interested in—the ones near the $3^{rd}$ turn. Other sports would benefit from a system that allows a spectator to more fully integrate the contest information with his desired viewing perspective. In addition to auto racing, football, yachting, horse racing, golf, hockey or any motor sport are candidates for the system and method hereof, especially as size and weight of GPS and radios accompanying a participant decreases.

U.S. Pat. No. 6,744,403 describes a GPS system for tracking objects, such as cars, at a sporting event. See also, U.S. Pat. No. 6,195,090; U.S. Patent Application Publication No. 2006/0105857; U.S. Patent Application Publication No. 2005/0259002. High data rate packet transmission is known, such as U.S. Pat. Nos. 6,894,994; 6,909,738; 6,885,652; 6,917,644; and 6,801,516. Examples of user interfaces, such as PDAs, cell phones, headsets, and the like are described, for example, in U.S. Pat. Nos. 7,053,780; 6,879,443; and 6,115,177. All references cited herein are incorporated by reference.

In navigation and locator GPS-based systems, what is lacking is an integrated GPS system for an individual user to gain situational awareness and to easily identify destinations or other areas of interest. That is, while a user might possess a GPS-enabled cell phone that transmits his position and gives text based directions to a destination, this information gives a very incomplete understanding to visually identify a destination. Such a user might have an overhead view of a map showing the position of the destination on the map, but leaves it up to the user to find and identify the destination.

A particular problem in the area of personal navigation is identifying a place of interest in a confusing environment, such as a crowded street. For example, a cell phone having a GPS might be enabled to identify that a destination is near, but the user cannot locate the destination because of the clutter or environment, e.g. a crowded street or neighborhood or obstructions to the user's line of sight. Users also have difficulty relating how a small mark identifying a place on a map correlates to their position or their view of the environment.

U.S. Pat. No. 7,002,551 describes augmented reality approaches based on digitized video camera or optical as follows:

Augmented Reality (AR) enhances a user's perception of, and interaction with, the real world. Virtual objects are used to display information that the user cannot directly detect with the user's senses. The information conveyed by the virtual objects helps a user perform real-world tasks. Many prototype AR systems have been built in the past, typically taking one of two forms. In one form, they are based on video approaches, wherein the view of the real world is digitized by a video camera and is then composited with computer graphics. In the other form, they are based on an optical approach, wherein the user directly sees the real world through some optics with the graphics optically merged in. An optical approach has the following advantages over a video approach: 1) Simplicity: Optical blending is simpler and cheaper than video blending. Optical see-through Head-Up Displays (HUDs) with narrow field-of-view combiners offer views of the real world that have little distortion. Also, there is only one "stream" of video to worry about: the graphic images. The real world is seen directly through the combiners, which generally have a time delay of a few nanoseconds. Time delay, as discussed herein, means the period between when a change occurs in the actual scene and when the user can view the changed scene. Video blending, on the other hand, must deal with separate video streams for the real and virtual images. Both streams have inherent delays in the tens of milliseconds. 2) Resolution: Video blending limits the resolution of what the user sees, both real and virtual, to the resolution of the display devices, while optical blending does not reduce the resolution of the real world. On the other hand, an optical approach has the following disadvantages with respect to a video approach: 1) Real and virtual view delays are difficult to match. The optical approach offers an almost instantaneous view of the real world, but the view of the virtual is delayed. 2) In optical see-through, the only information the system has about the user's head location comes from the head tracker. Video blending provides another source of information, the digitized image of the real scene. Currently, optical approaches do not have this additional registration strategy available to them. 3) The video approach is easier to match the brightness of real and virtual objects. Ideally, the brightness of the real and virtual objects should be appropriately matched. The human eye can distinguish contrast on the order of about eleven orders of magnitude in terms of brightness. Most display devices cannot come close to this level of contrast.

AR displays with magnified views have been built with video approaches. Examples include U.S. Pat. No. 5,625, 765, titled Vision Systems Including Devices And Methods For Combining Images For Extended Magnification Schemes; the FoxTrax Hockey Puck Tracking System, [Cavallaro, Rick. The FoxTrax Hockey Puck Tracking System. IEEE Computer Graphics & Applications 17, 2 (March-April 1997), 6-12.]; and the display of the virtual "first down" marker that has been shown on some football broadcasts.

U.S. Pat. No. 6,919,867 describes the state of the art in augmented reality approaches as follows:

Virtual reality is used in many diverse fields, such as kitchen design and military training. Virtual reality immerses a user in a digital environment, where the user's perceptions of sight and sound are manipulated by a computer. While virtual reality provides inexpensive alternatives to building a mock-up of a kitchen or firing live ammunition during an exercise on a battlefield, virtual reality systems lack the sophistication of human perception.

Virtual reality systems have evolved into augmented reality based systems, where a user's perception of a real environment is augmented with information . . . .

An augmented reality system can be used to provide guidance to a user, for example, providing information during a surgical procedure. A view of a patient's internal anatomical structures may be overlaid onto a real view of the patient. The internal structures are determined and shown in a graphical representation registered with the view of the real patient.

A head-mounted display (HMD) is a desirable means to display an augmented view to a user. Various HMDs are depicted at http://www.cs.unc.edu/~us/web/headmounts.htm. A HMD allows the user to vary the viewpoint by turning his or her head. However, HMDs are typically cumbersome, especially over longer periods. The weight of a HMD may put a significant strain on a user's neck and back, especially if the user assumes a pose with a tilted head.

The prior art proposes that the difference between the user's natural eye-point and the viewpoint of the video camera is a concern. The prior art proposes designs which attempt to align an imaging camera with the user's line of sight. Designs have been proposed to further include beam combiners to align the optical axis of a camera and a user, e.g., A. Takagai, S. Yamazaki, Y. Saito, and N. Taniguchi, "Development of a Stereo Video-See-Though HMD for AR Systems," IEEE and ACM Int. Symp. On Augmented Reality—ISAR 2000 (Munich, Germany, Oct. 5-6, 2000), pages 68-77. However, these systems do not address the comfort associated with wearing a HMD, particularly when the user assumes a pose with a tilted head.

For registration between the view of the real environment and the augmenting graphics, the user's viewpoint needs to be tracked. In prior art, head-mounted tracking cameras have been used for optical-see-through displays (where the user sees the real environment through a semitransparent display that shows additional graphics), but not for video-see-through displays. An example-of an optical-see-through HMD with two head-mounted tracking cameras in conjunction with a magnetic tracker is described by Thomas Auer and Axel Pinz in "Building a Hybrid Tracking System: Integration of Optical and Magnetic Tracking", Proceedings of the 2nd IWAR'99, IEEE Computer Society, (IWAR'99, San Francisco, Oct. 20-21, 1999). In the case of video-see-through HMDs, a method has been proposed which uses the views captured by the imaging cameras for tracking, and a magnetic tracker. See State, Andrei, Gentaro Hirota, David T. Chen, William F. Garrett, and Mark A. Livingston. "Superior Augmented-Reality Registration by Integrating Landmark Tracking and Magnetic Tracking." Proceedings of SIGGRAPH 96 (New Orleans, La., Aug. 4-9, 1996); Computer Graphics Proceedings, Annual Conference Series 1996, ACM SIGGRAPH, pgs. 429-438. However, the tracking capabilities exhibited by the known prior art systems are not suitable in a practical setting for tasks needing precise graphical registration.

A video-see-through display can be head-mounted. Tracking, e.g., by optical means, can be added to enable augmented reality visualization. See: F. Sauer, F. Wenzel, S. Vogt, Y. Tao, Y. Gene, and A. Bani-Hashemi, "Augmented Workspace: Designing an AR Testbed," IEEE and ACM Int. Symp. On Augmented Reality—ISAR 2000 (Munich, Germany, Oct. 5-6, 2000), pages 47-53.

Within the field of virtual reality, Fakespace Labs Inc. offers the BOOM (Binocular Omni-Orientation Monitor) personal immersive display for stereoscopic visualization on a counterbalanced, motion-tracking support structure. The BOOM utilizes opto-mechanical shaft encoders for tracking. Mechanical tracking requires the boom to be stiff to achieve precise measurements, this can increase the costs associated with a boom mechanism. A boom can be directed by a user's hand or connected to the user's head to free the hands. However, for applications, which need extended use, a head-mounted device can tire the user. In addition, a head-mounted solution is also not very practical if the display needs to be put on and taken off frequently.

U.S. Pat. Nos. 7,855,638; 8,275,397; 8,249,626; 8,207, 843, and U.S. Publication No. 2008/0198230 (all incorporated herein by reference) relate generally to viewing people, places, and events, such as sporting events, using positioning and artificial reality to improve the event viewing experience. While a plan view of a map is useful for event planning, such views can be confusing and typically have limited functions to interact with the event.

Commercial applications of augmented reality exist such as Layar, Wikitude, Junaio, Sekai Camera and others which use augmented reality to aid finding information about points of interest. See, e.g., www.layar.com, www.wikitude.org/en/, and www.junaio.com.

Products or services that are tailored to the user are prevalent, such as advertising models from Google based on search terms or advertising based on personal information of a user. For example, Apple postulates displaying advertising to a mobile customer using one of its devices based on marketing factors. To compute marketing factors the Apple system captures not only the machine identity, but search history, personal demographics, time of day, location, weather, loyalty program membership, media library, user opinion or opinions of friends and family, etc. (collectively, referred to as "marketing factors"). See, e.g., U.S. Publication Nos. 2010/0125492; 2009/0175499; 2009/0017787; 2009/0003662; 2009/0300122, and U.S. Pat. No. 7,933,900 (all incorporated herein by reference). Links to and use of social media, such as Facebook and Twitter, sometimes paired with location, are also possible indicators of a user behavior and user demographics. See e.g., U.S. Publication Nos. 2009/0003662; 2011/0090252, and U.S. Pat. Nos. 7,188,153; 7,117,254; 7,069,308 (all references cited herein are incorporated herein by reference).

Various attempts have been made at sharing sports related event information. For example, select information can be shared or published with groups as more fully described in U.S. Pat. No. 7,478,078 and U.S. Publication Nos. 2008/0036653; 2011/0142016; 2010/0070758; 2011/0098928; and 2009/0144392. Related applications, including U.S. Pat. No. 8,249,626 and U.S. Publication No. 2007/0117576 describe how locations, interest, social information, are created and published to groups or within defined groups. Groups can be formed based on certain criteria. Groups can be formed ahead of time or be dynamic. Social networking participants can view shared views and AR messages.

SUMMARY OF THE INVENTION

The present invention contemplates a system that provides target area information relevant to the viewer's selected perspective or location or is selectable to view the target area to another location or target. Preferably, the object is a target location, such as a destination location and the target is conveyed in the context of its background environment, such as a row of buildings on a city street. The user preferably has a portable viewing device that accepts the user's derived position and selectively displays a view of the target from the user's perspective or location or selectively from another location. Preferably, the user's portable viewing device includes an orientation indicator so that the user has feedback indicating the device is pointed towards the desired target. That is, the user can selectively view and identify a target from different locations, views, and magnification and the user can tell if the viewing device is oriented correctly. Even remote users can use a device with a network information feed to identify a target. In a preferred form, a geo-referenced billboard is included on or near the target and conveys information to the user. For example, messages such as advertisements or the name of the target can be conveniently displayed on the billboard.

For example, in a NASCAR race, the cars are all equipped with a GPS engine and a communication link to a central server. Each spectator has an internet device has a communication link to the central server. The internet device logs in with the central server, optionally authenticating and telling the server the spectator's selected location and optionally a target location or orientation. During the race, the positions of the cars are broadcast to the spectator's internet device. In one mode, the internet device displays information most relevant to the spectator's selected source location. For example, the position and vital information of the cars nearest the spectator's selected location. In another mode, the internet device has the processing power to take the positions of the cars and the location of the spectator's selection and render a depiction of the cars in real time on the track. The spectator can select the view. For example, the spectator might select "finish line," "overhead," "car 3 driver's view," or "my view."

A spectator might designate the 3rd turn as "my view" selected to see the perspective of the rendering on the internet device to match a view from the 3rd turn—i.e. the source location including elevation. This adds to a much greater enjoyment of the contest because visual data is added to the display which matches the spectator's desired observation. Importantly, the spectator can not only switch views and source locations, but can also tilt or pan the perspective or observation point or zoom. That is, from "my view" the spectator might rotate a toggle up incrementally up (or down) from the horizontal view from the spectator's selected location of the car positions to a vertical view of the contest. Preferably, the toggle would also allow left/right pan at any time.

In addition to the view of the vehicles (or contestants) the spectator can selectively view appended important information. For example, in one mode the user might select no information, in a second mode, the user might select car identification only, while in another mode, the user might select identification plus speed, plus acceleration of one or more selected cars. Other information from car sensors are possible (or derived from GPS information) such as linear or radial G, engine or tire condition, fuel state, etc. Preferably, the spectator could go from a view mode to other modes, such as a display of the current information of the cars in tabular form, a view from a particular camera (streaming video), pit video or rendering, etc. Preferably, the internet device could include a radio (such as WiFi, Zigbee, Ultrawideband, or WiMax) to relay other information such as audio for monitoring car or pit communications or radio broadcasts, or even streaming video of TV broadcasts in, e.g. a separate window.

In "my view," for example, the portable device might display only information to the 3rd turn selected position for cars nearest the 3rd turn. Alternatively, the spectator might want to follow a particular car continuously, e.g. follow car number 8, with selectable views (overheard, turns, stands, head, driver's view). In any of these modes, the spectator could zoom, pan or tilt as described above, freeze, slow motion, replay, etc. In many instances, the spectator might want to view the event from a position of a participant.

While one embodiment is described in the context of a car race such as NASCAR, IRL, NHRA, CART, Formula One, it is easily seen how the system and method of the present invention is applicable to a wide variety of spectator sports. Auto, aircraft, motorcycle, bicycle, boat racing, horse racing, football, soccer and hockey are just a few examples. Even hunting or fishing tournaments or TV shows would benefit from the system and method hereof. For example, a golf spectator (on the course or at home) might use the internet device to follow a particular golfer during a round. Information on the position of the player's golf ball can be supplied from a variety of sources—currently the PGA uses triangulation to acquire the data during play and provides the golf ball position information on its web site. However, the information could easily be gathered by a portable GPS unit accompanying the golfer's caddy or other dedicated data gatherer accompanying the golfer. Once the golf ball position information of each player is gathered, the information is distributed to the spectator based on the spectator's desires. As may be surmised from the NASCAR description above, the golf spectator might select the source viewing position and the target or orientation, determine the angle or view of the graphic rendering, the tilt, pan or zoom of the graphic depiction, the format of the presentation, i.e. graphic of a hole or a tabular summary of all golfers, or one golfer, statistics for a location or hole, etc.

While one limitation to the applicability of the present invention to a spectator sport is the ability to determine the position of a participant, those limitations are becoming less meaningful as technology progresses. For example, with current technology a football player can be fitted with a GPS device and radio that weighs less than ½ pound and is accurate within 2 meters. Foreseeable technology will enable such a device weighing several ounces (mostly battery weight), accurate with WAAS to less than 1 meters and with post-processing to centimeter accuracy. Accuracy to GPS positioning in an outdoor, unobstructed, clutter-free environment will soon be better than one meter. Post-processing at the server can occur in real time (or near real time) to achieve the desired participant accuracy. While the preferred embodiment contemplates obtaining participant location information via GPS, other types of location determination sensors are possible, such as proximity sensors, radar or radio triangulation. See, e.g., U.S. Pat. No. 5,564,698 for tracking hockey pucks, other objects, or people.

While the internet device of one embodiment is a gaming device with GPS and a radio (e.g., WiFi or Zigbee) other types of personal computers, gaming, PDA, and cell phones may equally be used. Further, although one embodiment contemplates broadcasting participant location information to spectators by radio, another embodiment broadcasts information to spectators over the internet. The rendering load of the data might be distributed, i.e., some of the graphics pipeline for the rendering could be accomplished at the server before transmission; other rendering can be performed on the internet device. However, rendering technology is rapidly advancing and becoming increasingly realistic with advances in game technology and as the processing power of the internet device increases and the rendering technology develops, it is anticipated that most of the graphics rendering can be performed at the internet device.

DESCRIPTION OF PREFERRED EMBODIMENTS

Figure 1:
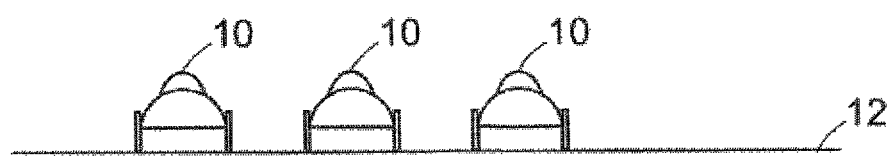
FIG. 1 is a diagram of a screen shot from the internet device showing a head on view of cars on a track.

High bandwidth, wireless networks are becoming commonplace, as is the computing power of mobile devices. Further rendering engines are becoming readily available for wide ranging applications of artificial reality. Viewing an event, such as a sporting event, using a mobile device adds greatly to the user experience. Many sporting events, such as golf, can be enhanced using a mobile device and artificial reality. U.S. Pat. No. 7,855,638 describes several examples of a system and method for viewing such events. In such event viewing systems, the background can be a real world image (e.g. photograph) or a virtual world rendering, but in a preferred case, artificial reality is used to enhance the perspective viewing experience.

In creating such environments for the venue of the event, such as a golf course, bike race, ski competition, or the like, it is desirable to insert virtual objects into the environment, such as messages, tips, targets, critiques, warnings, etc. The virtual objects overlay a background environment, preferably as viewed from a user selected position. Typically, the user selected position is a participant present position as determined by GPS. Thus, in a preferred embodiment the sport participant (golfer, skier, biker, etc.) is presented with a perspective view of the event from the participant's current position (i.e. "viewpoint") with virtual objects visually presented to the participant.

The present system and methods also address many sport related functions that can be used in such an artificial reality or mixed reality environment. For example, a basic function in golf is displaying in perspective view the golf hole from the golfer's location and identifying distances to hazards or the green. However, other functions exist, such as displaying suggested playing strategy based on the golfer's personal data or profile, a similar handicap golfer, or as suggested by tips from a pro. Further, games can be incorporated into the system and method such as corporate outing type experiences—closest to the pin, longest drive, accurate drive, as measured from an artificial reality target, etc. Other functions such as contests and betting can also be incorporated.

In the present application, the term "message" is used to encompass any artificial reality or virtual object, such as distance messages, advertisements, other facts, targets, shot distribution diagrams, event information, warnings, announcements and other types of alpha numeric displays. However, the message could also be a graphic, logo or brand. It shall be understood that other objects or graphics may also be enhanced and the term "message" is understood to include other objects.

In the present application, the term "social network" is used to refer to any process or system that tracks and enables connections between members (including people, businesses, and other entities) or subsets of members. The connections and membership may be static or dynamic and the membership can include various subsets within a social network. For example, a person's social network might include a subset of members interested in golf and the person shares a golf outing only with the golf interest subset. Further, a social network might be dynamically configured. For example, a social network could be formed for "Pebble Beach" for August 3 and anyone interested could join the Pebble Beach August 3 social network. Alternatively, anyone within a certain range of the event might be permitted to join. The permutations involving membership in a social network are many and not intended to be limiting.

A social network that tracks and enables the interactive web by engaging users to participate in, comment on and create content as a means of communicating with their social graph, other users and the public. In the context of the present invention, such sharing and social network participation includes participant created content and spectator created content and of course, jointly created content. For example, the created content can be interactive to allow spectators to add content to the participant created event.

The term "geo-referenced" means a message fixed to a particular location or object. Thus, the message might be fixed to a venue location, e.g., golf course fence or fixed to a moving participant, e.g., a moving golf car or player. An object is typically geo-referenced using either a positioning technology, such as GPS, but can also be geo-referenced using machine vision. If machine vision is used (i.e. object recognition), applications can be "markerless" or use "markers," sometimes known as "fiducials." Marker-based augmented reality often uses a square marker with a high contrast. In this case, four corner points of a square are detected by machine vision using the square marker and three-dimensional camera information is computed using this information. Other detectable sources have also been used, such as embedded LED's or special coatings or QR codes. Applying AR to a marker which is easily detected is advantageous in that recognition and tracking are relatively accurate, even if performed in real time. So, in applications where precise registration of the AR message in the background environment is important, a marker based system has some advantages.

In a "markerless" system, AR uses a general natural image instead of a fiducial. In general, markerless AR uses a feature point matching method. Feature point matching refers to an operation for searching for and connecting the same feature points in two different images. A method for extracting a plane using a Simultaneous Localization and Map-building (SLAM)/Parallel Tracking and Mapping (PTAM) algorithm for tracking three-dimensional positional information of a camera and three-dimensional positional information of feature points in real time and providing AR using the plane has been suggested. However, since the SLAM/PTAM algorithm acquires the image so as to search for the feature points, computes the three-dimensional position of the camera and the three-dimensional positions of the feature points, and provides AR based on such information, a considerable computation is necessary. A hybrid system can also be used where a readily recognized symbol or brand is geo-referenced and machine vision substitutes the AR message.

In the present application, the venue for the sporting event can be a real view or depicted as a photo background environment or a virtual environment, or a mixture, sometimes referred to as "mixed reality." A convenient way of understanding the messages of the present invention is as a layer of artificial reality or "augmented reality" messages overlaid the sporting event venue background. There are different methods of creating the sporting event venue background as understood by one of ordinary skill in the art. For example, an artificial background environment can be created by a number of rendering engines, sometimes known as a "virtual" environment. See, e.g., Nokia's (through its Navteq subsidiary) Journey View which blends digital images of a real environment with an artificial 3D rendering. A real environment can be the background as seen through glasses of FIG. 9, but can also be created using a digital image. Such a digital image can be stored and retrieved for use, such as a "street view" or photo, video, or panorama, or other type of stored image. Alternatively, many mobile devices have a camera for capturing a digital image which can be used as the background environment. Such a camera-sourced digital image may come from the user, friends, social network groups, crowd-sourced, or service provided. Because the use of a real environment as the background is common, "augmented reality" (AR) often refers to a technology of inserting a virtual reality graphic (object) into an actual digital image and generating an image in which a real object and a virtual object are mixed (i.e. "mixed reality"). AR is characterized in that supplementary information using a virtual graphic may be layered or provided onto an image acquired of the real world. Multiple layers of real and virtual reality can be mixed. In such applications the placement of an object or "registration" with other layers is important. That is, the position of objects or layers relative to each other based on a positioning system should be close enough to support the application. As used herein, "artificial reality" ("AR") is sometimes used interchangeably with "mixed" or "augmented" reality, it being understood that the background environment can be real or virtual.

Figure 2:
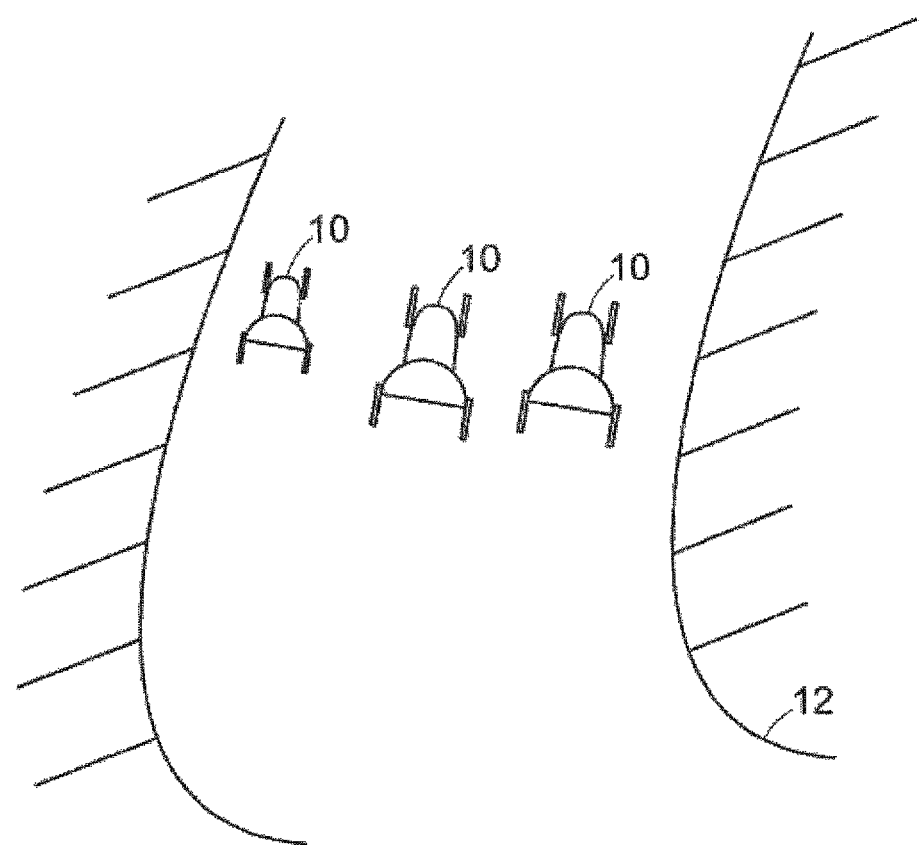
FIG. 2 is a diagram of a screen shot from the internet device showing the cars of FIG. 1 with the rendering tilted up.
Figure 3:
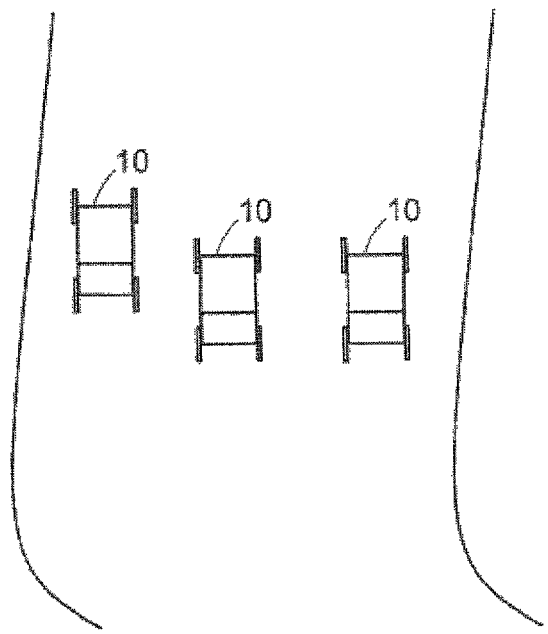
FIG. 3 is a diagram of a screen shot from the internet device showing the cars of FIG. 1 with an overhead view.

Turning to the drawings, cars 10 traverse a track 12. In FIG. 1, the spectator has selected a position at the 3rd turn of an oval track and FIG. 1 is a rendering similar to the spectator's selected view. In FIG. 2, the spectator has tilted upwardly his view so that the spectator has an oblique angle view of the cars 10 of FIG. 1. FIG. 3 is the same depiction of the cars on the track, but the view is further tilted upward to a direct, overhead view of the track 12.

Figure 4:
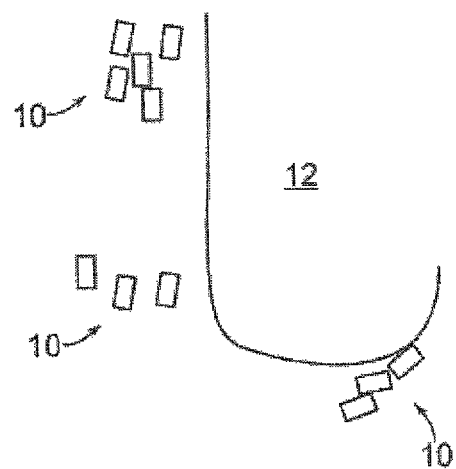
FIG. 4 is a diagram of a screen shot from the internet device showing the cars of FIG. 3 with a zoom out as compared to FIG. 3.
Figure 5:
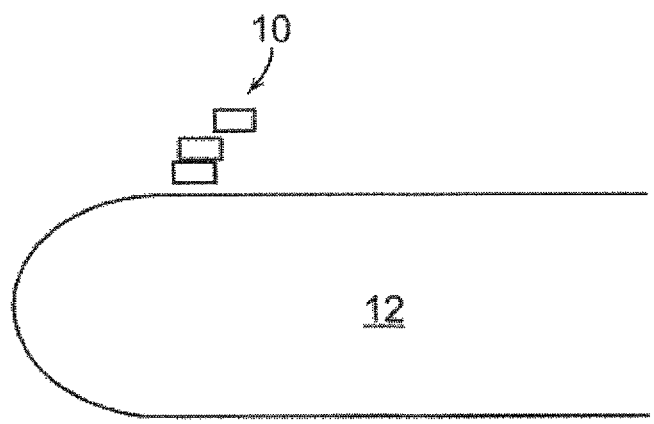
FIG. 5 is a diagram of a screen shot from the internet device showing the cars of FIG. 4 from a different angle or perspective.

FIG. 4 is of a view of the same cars 10 on the track 12 at the same moment in time as FIGS. 1-3, but the view is "zoomed" outwardly changing the scale and allowing the spectator to see more of the cars 10 on the track 12. FIG. 5 is similar in scale to FIG. 4, but the perspective has been changed to the finish line. While the display of the track 12 in FIGS. 1-4 is of an actual race, at time trials the spectator could alternatively obtain from a server a "SimulCam" using technology such as available from Dartfish where each car is superimposed at a certain time into the time trial over the position of other cars.

Of course, other data can be incorporated into the views of FIGS. 4 and 5. In particular, any geographic referenced datasets can be incorporated into a single view which includes aerial or satellite imagery, Street View imagery from Google or Street Level View from Microsoft or Telenav (3D building models), terrain elevation, mapping data or other data such as from Dartfish referenced above. The views, therefore, can be a composite of imagery, virtual (rendered), or augmented reality. The views can be 2D or 3D, and from almost any viewing angle or perspective as described herein. Therefore, in the present application, the term "background" is used to denote a realistic perspective view which can be generated as a photo image, a rendered graphic image with augmented reality, a graphic image outline, or combinations thereof. While the cars are displayed in real time (or nearly so), other data or information can be displayed in real time (or nearly so). Typically, each dataset is treated as a layer in a composition of layers, and placed in exact geographic position and scale—so-called "geographic referenced" or "geo-referenced." 3D perspectives of these combined datasets are rendered. The position of the source or starting viewpoint can be selected by the user.

Preferably, the position of the "source" can be specified, e.g. my position or participant's position (driver of car 3). Additionally, the target or direction can be specified. A particular useful sensor augmentation to the GPS information is a "direction" or orientation finder for the device 20. GPS always tells a bearing to a waypoint from a GPS determined location or source. That is, device 20 can give the user a bearing from the current user location (source) to the meeting point location or rendezvous location for one or more friendly participants. GPS information can give direction of travel when the device 20 is moving. When stopped, the orientation of the device 20 relative to the location of another participant or rendezvous location is useful information. So, in addition to the bearing to the rendezvous location the user could know if the device 20 was oriented in the correct direction—i.e., pointed to the rendezvous location or another participant or target area.

Methods are available for determining orientation of a device using GPS, but usually such GPS methods employ multiple antennas. Other means for determining direction are believed to be preferred, such as a fluxgate compass, INS, gyrocompass, digital compass, fluxgate magnetometers, or multi-axis accelerometers to name a few. Preferably, device 20 includes a direction-determining mechanism which is selectable to another location or a designated participant, and tells the user when device 20 is oriented or pointed correctly to a selected target. Alternatively, the user can select the source (e.g. current location) and the target (e.g. car #3). The user can then additionally deviate from a direct line from the source to the target by, for example, moving the elevation.

Figure 6:
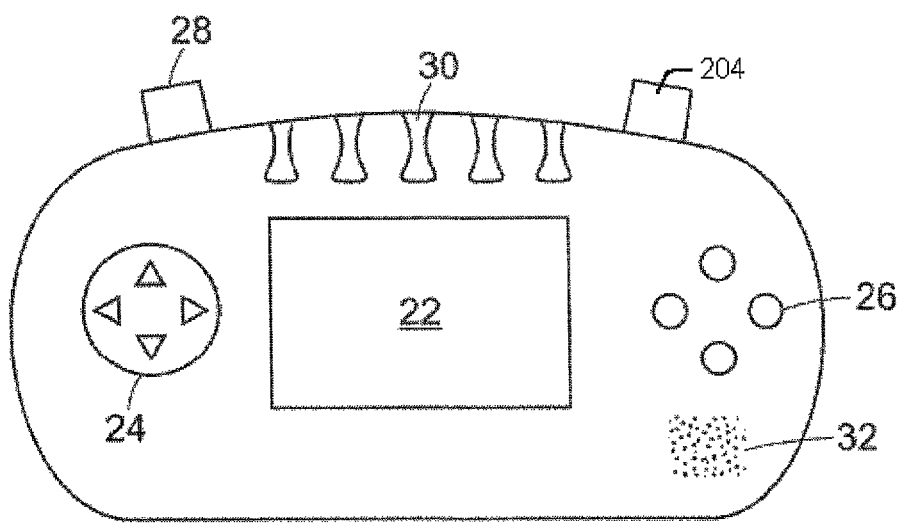
FIG. 6 is a depiction of a portable device.

FIG. 6 is a front elevation of a graphic device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 6. Not shown are the SD card slot, USB or power ports, or a camera. The Gizmondo is powered by a 400 MHz ARMS processor and has a 2.8 inch 320×240 pixels TFT screen 22 and an NVIDIA 128 bit GeForce 3D 4500 GPU featuring a programmable pixel shader, hardware transform engine, and 1280 KB of embedded memory.

While the device 20 of FIG. 6 uses an ARM 9 processor and Sirf GPS chipset, substitutions can be readily made (e.g. uBlox GPS chipset) as well as substitutions to display 22 and memory capacity. The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications.

Figure 8:
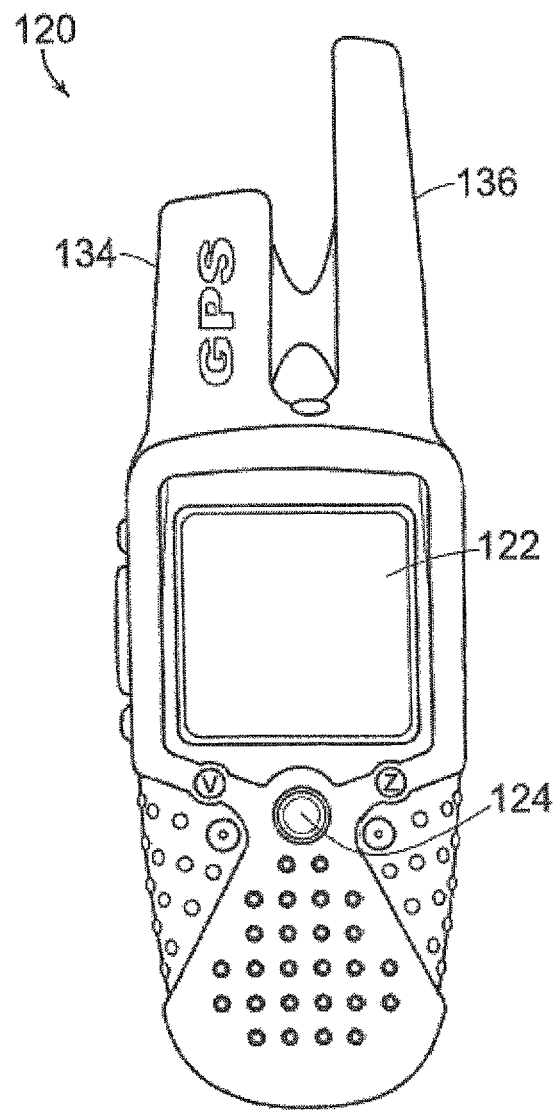
FIG. 8 is a perspective of an alternative embodiment of a portable device, resembling a PDA or a cell phone.
Figure 9:
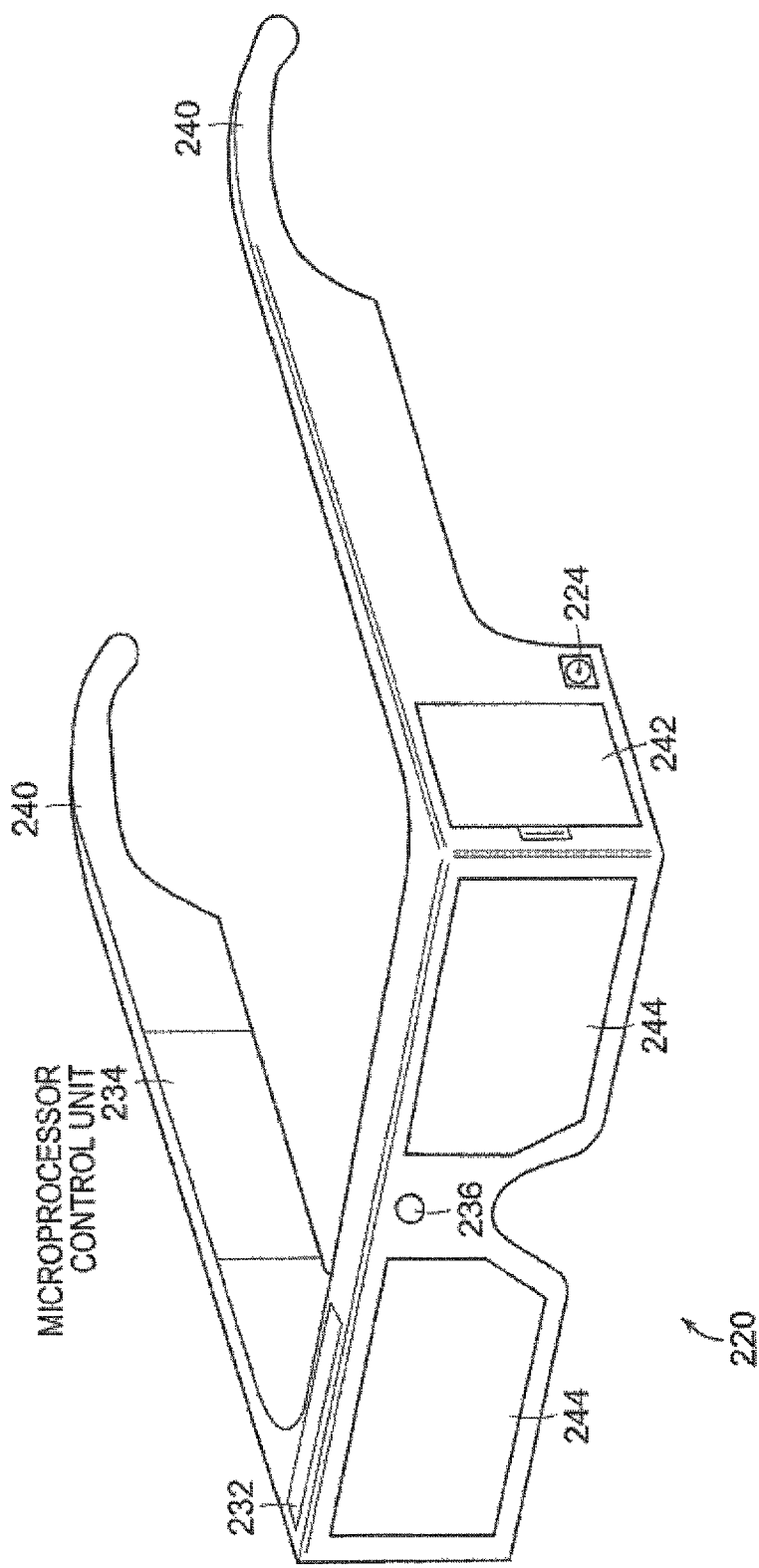
FIG. 9 is a perspective of a portable device where the functionality is built into glasses or goggles worn by the spectator.
Figure 10:
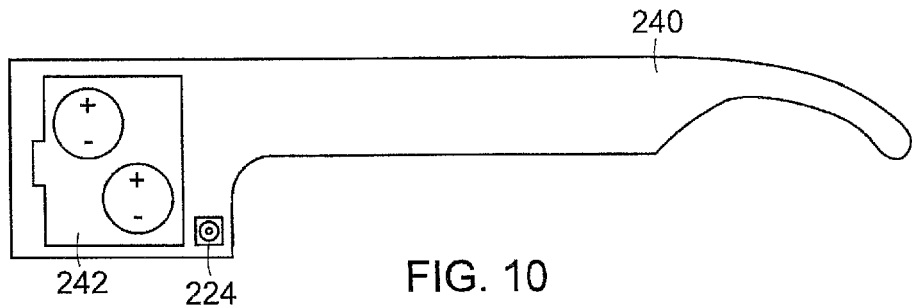
FIG. 10 is a side view of the glasses of FIG. 9.
Figure 11:
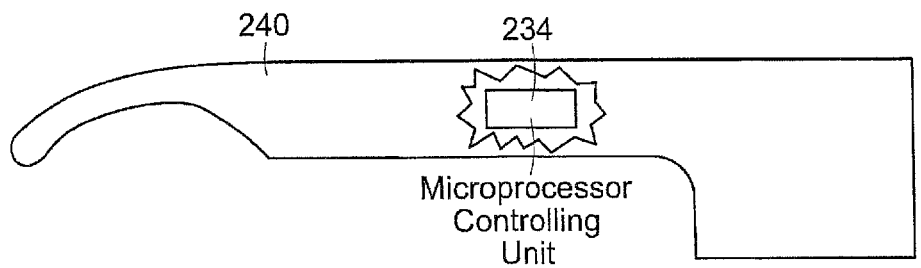
FIG. 11 is a side view of the glasses of FIG. 9 from the other side.
Figure 12:
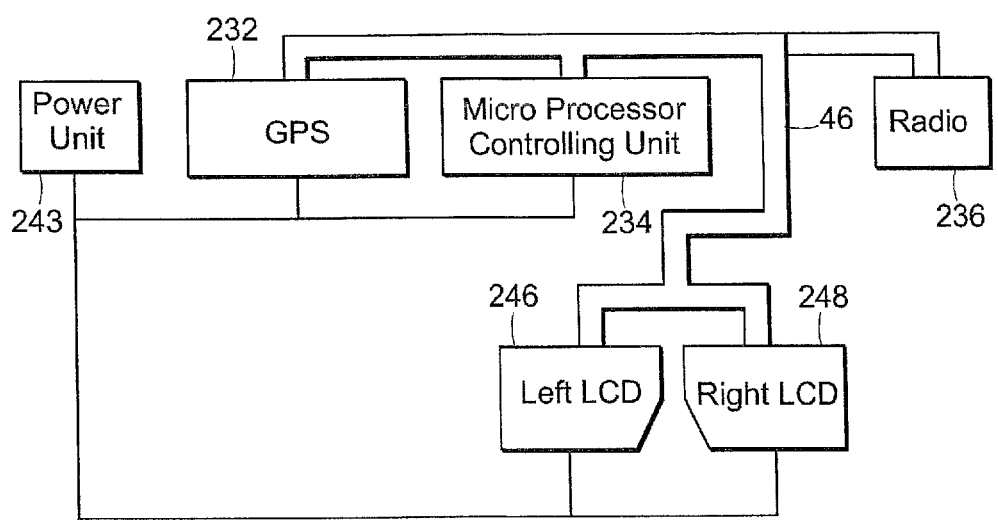
FIG. 12 is a block diagram of the functionality of the glasses of FIG. 9.

FIGS. 8 and 9 each depict an alternative graphic device carried by the spectators. For example, the graphic device 120 of FIG. 8 includes a GPS/antenna 134, communications antenna and radio 136, a display 122, and a directional pad 124. In addition to the Gizmondo type device of FIG. 6, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

Similarly, the graphic device 220 of FIGS. 9-12 is in the configuration of glasses or goggles and includes a GPS and patch antenna 232, microprocessor 234, radio 236. Controls, such as the directional pad 224, are on the side frames (opposite side shown in FIG. 10). Batteries are stored in compartment 242. The displays are transparent LCD's as at 244 and, in particular, are LCD's left 246 and right 248 illustrated in FIG. 12. Examples of such a device are the MyVue headset made by MicroOptical Corp. of Westwood, Mass. (see, U.S. Pat. No. 6,879,443). A particular benefit of the use of wearable glasses such as the embodiment of FIG. 9 is the ability to incorporate augmented reality, e.g. point of interest overlays. The yellow first down marker in football television broadcasts is an example. In this embodiment, a finish line or other point of interest overlays or markers can be highlighted, or a particular participant, or statistics on a particular participant can be viewed. In the NASCAR example, a spectator wearing the FIG. 9 glasses could see the cars, "augmented" track data (finish line) and selectively highlight a particular car and statistics for that car (e.g. fuel remaining, lap time, time back or ahead, mile per hour, miles remaining, etc.) See, e.g., U.S. Pat. Nos. 7,002,551; 6,919,867; 7,046,214; 6,945,869; 6,903,752; 6,317,127 (herein incorporated by reference).

As used herein, GPS is meant to include all of the current and future positioning systems that include satellites, such as the U.S. Navistar, GLONASS, Galileo, EGNOS, WAAS, MSAS, QZSS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Even without differential correction, numerous improvements are increasing GPS accuracy, such as the increase in the satellite constellation, multiple frequencies ($L_1$, $L_2$, $L_5$), modeling and AGPS improvements, software receivers, and ground station improvements. Of course, the positional degree of accuracy is driven by the requirements of the application. In the NASCAR embodiment of the preferred embodiment, two meter accuracy provided by WAAS would normally be acceptable.

Figure 7:
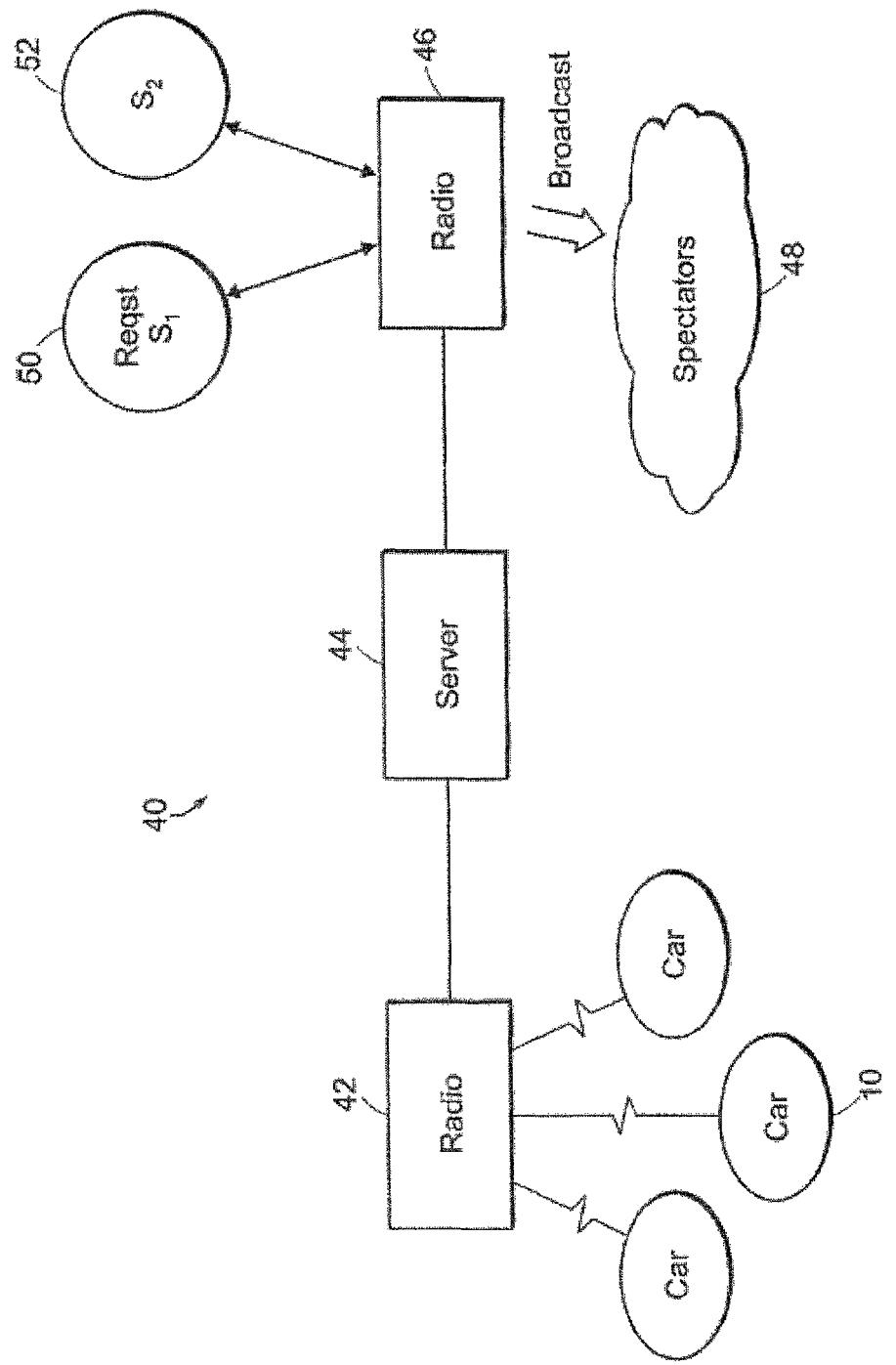
FIG. 7 is a block diagram depicting the network at a racetrack.

In FIG. 7, a depiction of the network 40 is shown. The cars 10 communicate with a radio base station 42 preferably using spread spectrum radio (encrypted or secured if desired). A spread spectrum radio such as made by Freewave Technologies of Boulder, Colorado is a preferred choice (e.g. a 900 MHz board level module). The server 44 stores the position data of each car 10 communicated to the base station 42, and other pertinent data such as car sensor data, etc. Ideally, the server 44 can also digitally store the voice communications of interest (e.g. pit to driver) and video clips of various scenes of possible interest. Of course, the server 44 can store advertising messages as well for delivery to spectators. The server 44 can also be used for authentication of graphic devices 20 and enable selectable purchases from spectators (i.e. refreshments or memorabilia for delivery). The server 44 can also process the incoming position data to increase the accuracy if desired. For example, the server 44 can include its own base station GPS and apply a correction to a participant's position if desired. In some sports, the participants might broadcast location information directly to spectators, i.e. without an intervening server. The radio 46 is used to communicate on a broadcast basis to all spectators 48—here using a GSM tri-band, the GPS position information of the cars 10 (encrypted or secured if desired). The devices 20 in the hands of the spectators 48 processes the position information to render the views illustrated for example in FIGS. 1-5.

Figure 13:
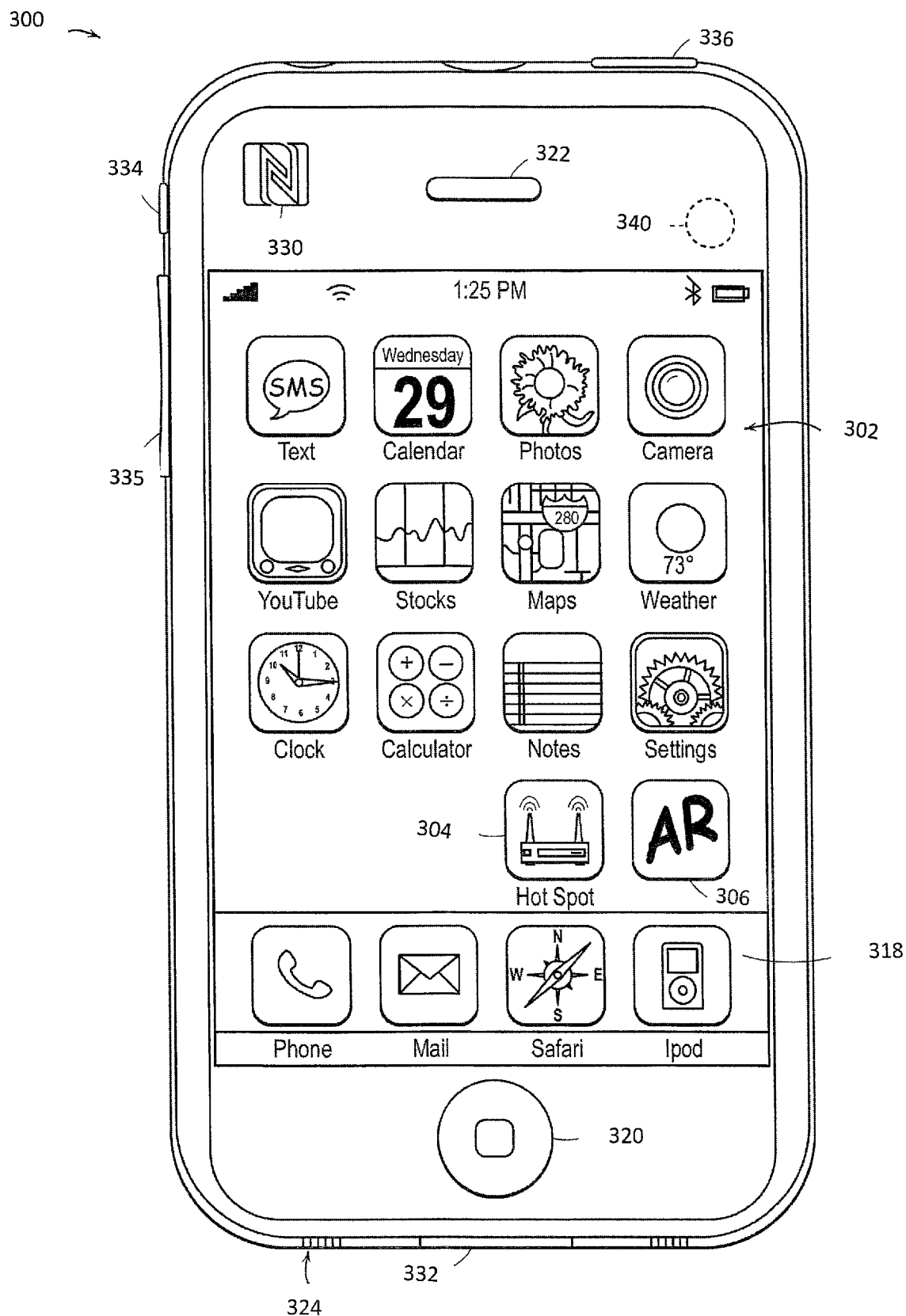
FIG. 13 is is a front elevation view of a smart phone having a graphics display.

An illustrative embodiment uses a mobile device, such as smart phone 300 of FIG. 13, accompanying the golfer. The golfer selects AR application 306 on the touch sensitive graphics display 302. Smart phone 300 includes a variety of sensors, including a GPS unit for determining its location, a gyroscope for determining the orientation, an accelerometer, ambient light sensor and a digital compass. Additionally, phone 300 includes one or more radios, such as a packet radio, a cell radio, WiFi, Bluetooth, and near field. Of course, other devices can be used such as the dedicated golf handheld devices as well as a tablet computer having GPS, especially the tablets with screen sizes larger than a smart phone but smaller than about 10 inches to aid portability, such as a Dell Streak, Motorola Xoom, or Samsung Galaxy. In some embodiments, the device can be a tablet affixed to a golf cart with a camera oriented in the direction of travel. That is, in some embodiments, a wireless camera connected to a Bluetooth compatible device 300 may be preferred. Examples of such cameras are JonesCAM LX, Vuzix iWear CamAR available from Vuzix Corporation, Rochester, New York, AT-1Wireless available from Dogcam, and ContourGPS available from Contour HD.

In more detail, FIG. 13 is a front elevational view of a smart phone or mobile device 300, which is the preferred form factor for the device discussed herein to illustrate certain aspects of the present invention. Mobile device 300 can be, for example, a handheld computer, a tablet computer, a personal digital assistant, a cellular telephone, a camera having a GPS and a radio, a GPS with a radio, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing.

Mobile device 300 includes a touch-sensitive graphics display 102. The touch-sensitive display 302 can implement liquid crystal display (LCD) technology, light emitting polymer display (LPD) technology, or some other display technology. The touch-sensitive display 302 can be sensitive to haptic and/or tactile contact with a user.

The touch-sensitive graphics display 302 can comprise a multi-touch-sensitive display. A multi-touch-sensitive display 302 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Patent Application Publication No. 2002/0015024, each of which is incorporated by reference herein in its entirety. Touch screen 302 and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 302.

Mobile device 300 can display one or more graphical user interfaces on the touch-sensitive display 302 for providing the user access to various system objects and for conveying information to the user. The graphical user interface can include one or more display objects 304, 306. Each of the display objects 304, 306 can be a graphic representation of a system object. Some examples of system objects include device functions, applications, windows, files, alerts, events, or other identifiable system objects.

Mobile device 300 can implement multiple device functionalities, such as a telephony device, as indicated by a phone object; an e-mail device, as indicated by the e-mail object; a network data communication device, as indicated by the Web object; a Wi-Fi base station device (not shown); and a media processing device, as indicated by the media player object. For convenience, the device objects, e.g., the phone object, the e-mail object, the Web object, and the media player object, can be displayed in menu bar 318.

Each of the device functionalities can be accessed from a top-level graphical user interface, such as the graphical user interface illustrated in FIG. 13. Touching one of the objects e.g. 304, 306, etc. can, for example, invoke the corresponding functionality. In the illustrated embodiment, object 306 represents an Artificial Reality application in accordance with the present invention.

Upon invocation of particular device functionality, the graphical user interface of mobile device 300 changes, or is augmented or replaced with another user interface or user interface elements, to facilitate user access to particular functions associated with the corresponding device functionality. For example, in response to a user touching the phone object, the graphical user interface of the touch-sensitive display 302 may present display objects related to various phone functions; likewise, touching of the email object may cause the graphical user interface to present display objects related to various e-mail functions; touching the Web object may cause the graphical user interface to present display objects related to various Web-surfing functions; and touching the media player object may cause the graphical user interface to present display objects related to various media processing functions.

The top-level graphical user interface environment or state of FIG. 13 can be restored by pressing button 320 located near the bottom of mobile device 300. Each corresponding device functionality may have corresponding "home" display objects displayed on the touch-sensitive display 302, and the graphical user interface environment of FIG. 13 can be restored by pressing the "home" display object.

The top-level graphical user interface is shown in FIG. 13 and can include additional display objects, such as a short messaging service (SMS) object, a calendar object, a photos object, a camera object, a calculator object, a stocks object, a weather object, a maps object, a notes object, a clock object, an address book object, and a settings object, as well as AR object 306. Touching the SMS display object can, for example, invoke an SMS messaging environment and supporting functionality. Likewise, each selection of a display object can invoke a corresponding object environment and functionality.

Mobile device 300 can include one or more input/output (I/O) devices and/or sensor devices. For example, speaker 322 and microphone 324 can be included to facilitate voice-enabled functionalities, such as phone and voice mail functions. In some implementations, loud speaker 322 can be included to facilitate hands-free voice functionalities, such as speaker phone functions. An audio jack can also be included for use of headphones and/or a microphone.

A proximity sensor (not shown) can be included to facilitate the detection of the user positioning mobile device 300 proximate to the user's ear and, in response, disengage the touch-sensitive display 302 to prevent accidental function invocations. In some implementations, the touch-sensitive display 302 can be turned off to conserve additional power when mobile device 300 is proximate to the user's ear.

Other sensors can also be used. For example, an ambient light sensor (not shown) can be utilized to facilitate adjusting the brightness of the touch-sensitive display 302. An accelerometer (not shown) can be utilized to detect movement of mobile device 300, as indicated by the directional arrow. Accordingly, display objects and/or media can be presented according to a detected orientation, e.g., portrait or landscape.

Mobile device 300 may include circuitry and sensors for supporting a location determining capability, such as that provided by the global positioning system (GPS) or other positioning system (e.g., Cell ID, systems using Wi-Fi access points, television signals, cellular grids, Uniform Resource Locators (URLs)). A positioning system (e.g., a GPS receiver) can be integrated into the mobile device 10 or provided as a separate device that can be coupled to the mobile device 10 through an interface (e.g., port device 332) to provide access to location-based services.

Mobile device 300 can also include a front camera lens and sensor 340. In a preferred implementation, a backside camera lens and sensor is located on the back surface of the mobile device 300. The cameras can capture still images and/or video. The camera subsystems and optical sensors may comprise, e.g., a charged coupled device (CCD) or a complementary metal-oxide semiconductor (CMOS) optical sensor, can be utilized to facilitate camera functions, such as recording photographs and video clips. Camera controls (zoom, pan, capture and store) can be incorporated into buttons 334-336 (FIG. 13.)

While the preferred embodiment contemplates most processing occurring at mobile devices, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device, but an engineering choice would be to preprocesses some of the location and rendering information at the server 44 prior to broadcast.

Mobile devices 20, 120, 220, 300 preferably accompanies some of golfers in attendance at the course. Devices 20, 120, 220, 300 communicate over one or more wired and/or wireless networks 46 in data communication with server 44.

In addition, the devices can communicate with a wireless network, e.g., a cellular network, or communicate with a wide area network (WAN), such as the Internet, by use of a gateway. Likewise, an access point associated with Radio 46, such as an 802.11b/g/n wireless access point, can provide communication access to a wide area network.

Both voice and data communications can be established over the wireless network of FIG. 7 and access point 46 or using a cellular network. For example, mobile devices can place and receive phone calls (e.g., using VoIP protocols), send and receive e-mail messages (e.g., using POP3 protocol), and retrieve electronic documents and/or streams, such as web pages, photographs, and videos, over the wireless network, gateway, and wide area network (e.g., using TCP/IP or UDP protocols). Likewise, mobile devices can place and receive phone calls, send and receive e-mail messages, and retrieve electronic documents over access point 46 and the wide area network. In some implementations, mobile device can be physically connected to access point 46 using one or more cables and the access point can be a personal computer. In this configuration, mobile device 3010 can be referred to as a "tethered" device.

Mobile devices 20, 120, 220, 300 can also establish communications by other means. For example, wireless device 20, 120, 220, 300 can communicate with other wireless devices, e.g., other wireless devices 100, cell phones, etc., over a wireless network. Likewise, mobile devices can establish peer-to-peer communications, e.g., a personal area network, by use of one or more communication subsystems, such as the Bluetooth™ communication device. Other communication protocols and topologies can also be implemented.

In use in the play of golf, it is believed preferable to use a real environment as the background, such as a digital image captured by backside camera of FIG. 13. In many cases, this real background environment can be augmented with other golfers pictures or archived video. Typically, the golfer would activate one of the buttons 334-336 at each shot so that the spectators could more easily follow the round.

In other embodiments, a virtual environment may be used as the background. In such cases, server 44 preferably uses the OTOY, Gaikai, or OnLive video compression technology to transmit the participant position information the virtual background environment, as well as the AR objects, such as each car 54. OTOY (and Gaikai and OnLive) are cloud based gaming and application vendors that can transmit real time photorealistic gaming to remote gamers. Such companies that render photorealistic 3D games for realtime remote play are Otoy, see, e.g., www.otoy.com; OnLive, see, e.g., en.wikipedia.org/wiki/OnLive; and Gaikai, see, e.g., technabob.com/blog/2010/03/16/gaikai-cloud-based-gaming. Onlive, for example, advertises that with 5 mbps it can transfer 220 frames per second with 12-17 ms latency, employed advanced graphics—ajax, flash, Java, ActiveX.

The goal is high performance game systems that are hardware and software agnostic. That is, a goal is intense game processing performed on a remote server and communicated to the remote user. Using such cloud based gaming technology, smart phones 300 can run any of the advanced browsers (e.g. 1E9 or Chrome) running HTML5 that support 3D graphics. However, other AR specific browsers can alternatively be used, such as available from Layar, Junaio, Wikitude, Sekai Camera or Mixare (www.mixare.org). While OTOY (and Gaikai and OnLive) promise no discernable latency in their gaming environment, server 44 for the golf event of FIG. 6 is preferably placed at the venue of the event.

Therefore, the amount of processing occurring at server 44 versus devices 20, 120, 220, 300 is a design choice based on the event, the background, the radio network available, the computational and display capability available at the device or other factors.

In addition the content of the advertisement messages can be changed based on context. Such smart phones 300 have not only machine ID's, but also search history, location history, and even personal information. Further, the user might be identified based on social media participation—e.g. Facebook or Twitter accounts. Such information is considered "context" in the present application, along with the typical demographics of an event and "marketing factors" as previously discussed. That is, the event might have its own context which indicates the demographic profile of most of the spectators at the event. A golf match might have a context of golf spectators with adequate disposable income to purchase a vehicle. Therefore, advertising a Buick makes advertising sense. See, U.S. patent application Ser. No. 13/152,476 (incorporated by reference).

Graphics

The graphics generated on the screen 22 (FIG. 6) can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline technology is advancing dramatically, mainly driven by gaming applications enabling more realistic 3D synthetic renderings of FIGS. 1-5.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card. These APIs for 3D computer graphics are particularly popular:

OpenGL and the OpenGL Shading Language
OpenGL ES 3D API for embedded devices
Direct3D (a subset of DirectX)
RenderMan
RenderWare
Glide API
TruDimension LC Glasses and 3D monitor API There are also higher-level 3D scene-graph APIs which provide additional functionality on top of the lower-level rendering API. Such libraries under active development include:

QSDK
Quesa
Java 3D
JSR 184 (M3G)
NVidia Scene Graph
OpenSceneGraph
OpenSG
OGRE
Irrlicht
Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20. Driven by the game studios, hardware manufacturers such as ATI, Nvidia, Creative Labs, and Ageia have developed graphics accelerators which greatly increase the 3D rendering capability. It can be anticipated that in the future, one or more graphics rendering chips, such as the Ageia Physx chip, will be added to the device 20.

While full 3D rendering is not possible with the device 20 described herein, advances in processing and rendering capability will enable greater use of 3D graphics in the future. In a particular application, such as NASCAR, a car object and a track object (e.g., Taladega) can be rendered in advance and stored, making realistic 3D graphics possible. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from spectators 48 can be made to the server 44, such as for streaming video of a particular scene or audio of a particular car 10, refreshment orders, memorabilia purchases, etc. This function is shown at 50, 52 in FIG. 7.

While one embodiment has been described in the context of a spectator in physical attendance at a sporting event with information broadcast by radio, the use of the graphic devices 20, 120, 220, 300 at remote locations is equally feasible. In another embodiment more suited for remote locations, for example, the portable device 20, 120, 220, 300 can be used at home while watching a sporting event on TV, with the participant location and other information streaming over the internet. WiFi in the home is a preferred mode of broadcasting the information between the portable device and the network.

Using graphic devices 20, 120, 220, 300 at home while watching the same sporting event on TV is believed to be a preferred embodiment for use at remote locations. However, other examples of remote location of a sporting event viewing might not be accompanied by watching TV. That is, the views of FIGS. 1-5 can be accomplished using any graphic device, including a personal computer or a cell phone. Similar to using the graphic device 20, 120, 220, 300 coupled to the internet, a personal computer user can select the source or position of origination of the desired view, and the target or orientation from the source or target. Elevations, zoom, pan, tilt, etc. may be selected by the remote user as described above.

Some spectators 48 may be remote from the sporting event. In this case, server 44 can transmit the desired information over internet connection 49 to the club house, home computer or television remote from the event. While one embodiment has been described in the context of a spectator in physical attendance at the golf course with information broadcast by radio, the use of devices 20, 120, 220, 300 at remote locations is equally feasible. In another embodiment more suited for remote locations, for example, portable device 20, 120, 220, 300 can be used at home while watching a golf event on TV, with the participant location and other information streaming over the internet. WiFi in the home is a preferred mode of broadcasting the information between the portable device and the network.

One function of the server 44 is to allow observation of a round by a golfer, either in real time or post play. That is, the views can be posted to the server 44 and observed by a spectator 48 using any graphic device, including a personal computer, tablet, or a cell phone. Similar to using graphic device 20, 120, 220, 300 coupled to the internet, a personal computer spectator can select the source or position of origination of the desired view, and the target or orientation from the source or target. Elevations, zoom, pan, tilt, etc. may be selected by the remote spectator as desired to change the origin viewpoint or size.

In "my view," for example, the remote location graphic device might display only information to the 3rd turn spectator for cars nearest the 3rd turn. Alternatively, the remote location spectator might want to follow a particular car continuously, e.g. follow car number 8 (or particular golfer, etc.), with selectable views (overheard, turns, stands, head, driver's view). In any of these modes, the remote location spectator could zoom, pan or tilt as described above, freeze, slow motion, replay, etc. to obtain a selected view on the graphic device.

Messages can be conveyed using more conventional designations such as sidebar advertisements, pop-up balloons with advertisements or messages, click info, banner ads, etc. However, a billboard area may be convenient as an area that does not interfere with other features of the target. Other examples of billboard can be large windows, open facades, real or artificial signs, doorways, or the like. Because the billboard is geo-referenced and the information is in the digital domain, the message on the billboard stays in the same location on the building as the user's view changes.

What is claimed:

1. A system for observing a sporting event having sport participants at a sporting event venue by a user comprising:
   an internet communication connection operable for receiving a plurality of sport participants positions at the sporting event venue in approximately real time during the sporting event;
   an internet device coupled to the communication connection for receiving participant positions at the sporting event venue including a display selectable by the user to display different views of the sporting event venue in approximately real time during the sporting event with one view displaying one or more participants, wherein the user can select the position of the source of a view of the venue.

2. The system of claim 1, wherein the user view selectable on the display is to a target from the spectator's selected source view of the venue.

3. The system of claim 1, wherein the user view selectable on the display is an orientation of the view from the user's selected source position.

4. The system of claim 1, wherein said internet device includes a processor for receiving said participant positions and for comparing said participant positions with said user's selected source position, and is coupled to said display to generate said user view from the user's selected source position to one or more participant positions.

5. The system of claim 1, wherein said user view from the user's selected source position is adjustable by the user to zoom in or out.

6. The system of claim 1, wherein one of said user's different views is an overhead view of the venue for the sporting event.

7. The system of claim 1, wherein said user's selected source position is the position of one of the participants.

8. The system of claim 1, wherein said user's different views on said display include a composition of geographic referenced datasets, including at least imagery and virtual renderings.

9. The system of claim 8, wherein one of said user's different views includes geographic referenced positions of one or more participants overlaid said composition.

10. A method for observing a sporting event having a number of sport participants at a sporting event venue comprising:
    receiving in approximately real time during the sporting event the determined positions of one or more participants at the venue of the sporting event;
    receiving in approximately real time during the sporting event one or more participant positions on a spectator's device having a display;
    viewing in approximately real time during the sporting event on the display of a spectator's device a perspective view of multiple participant positions at the sporting event venue including the background environment; and
    viewing during the sporting event a geo-referenced message on a location or object in the background environment at a sporting event venue and displayed on the display to convey information to the spectator, wherein said message is geo-referenced to said location or object from different user-perspective views.

11. The method of claim 10, wherein said device includes an input mechanism for selecting a source location for viewing the sporting event, one of the selectable points of view being from the selected source position.

12. The method of claim 11, wherein one of said points of view being an overhead view of said venue.

13. The method of claim 10, wherein said participant position are determined with a GPS receiver at least in part.

14. The method of claim 10, wherein said participant positions are transmitted to a server, wherein said spectator's device authenticates with said server, and wherein said server communicates said participant positions to authenticated devices.

15. The method of claim 11, wherein said spectator can select the target or orientation from the selected source location.

16. A method of viewing a sporting event having at least one moving participant at a sporting event venue by a spectator comprising:
    selecting a source position for viewing the sporting event venue on a display;
    receiving the positions of one or more participants at said sporting event venue in approximately real time;
    viewing a depiction of multiple participant positions at said sporting event venue on said display;
    viewing the depiction on said display from said selected source position during the sporting event; and
    selectively changing the view point of said depiction at said sporting event venue from said source position to another position during the sporting event.

17. The method of claim 16, wherein said depiction comprises a background composition of imagery and artificial reality associated with said one or more participant positions superimposed in geo-referenced relation.

18. The method of claim 16, wherein changing the view point of said depiction comprises rotating the depiction in a vertical axis to a tilt view.

19. The method of claim 16, the participants positions are received in approximately real time over the internet and viewing a virtual reality message associated with a displayed participant.

20. The method of claim 16, wherein changing the view point of said depiction comprises changing the view point to the location of a participant.

21. The system of claim 1, wherein a view on said display includes a virtual rendering associated with a displayed participant.

22. The system of claim 21, wherein said virtual rendering includes a message associated with said displayed participant.

23. The system of claim 21, wherein said virtual rendering is georeferenced to said displayed participant.

24. The system of claim 1, wherein said internet device is remote from the venue of the sporting event.

25. The system of claim 1, wherein said internet device is proximate to the venue of the sporting event.

26. The system of claim 1, wherein said internet device comprises a portable device and said internet communication connection comprises a radio coupled to the internet device.

27. The system of claim 1, wherein said internet device comprises a gaming device, personal computer, gaming PDA, a cell phone, smart phone, tablet computer, head mounted display, glasses or a game console.

28. The system of claim 1, wherein said internet device is coupled to the communication connection for receiving advertising in approximately real time during the sporting event.

29. The method of claim 10, wherein said georeferenced message is associated with a participant in said perspective view.

30. The method of claim 10, wherein said georeferenced message comprises a georeferenced billboard associated with a location at the venue of the sporting event.

31. A system for enabling a user to observe a sporting event having sport participants at a sporting event venue comprising:
    an internet communication connection operable for transmitting a plurality of sport participants positions at the sporting event in approximately real time during the sporting event;
    program instructions operating on an internet device coupled to the communication connection for receiving participant positions, said program instructions operable to allow the user to display different views of the sporting event venue in approximately real time during the sporting event with one view displaying one or more participants, and operable to allow the user to select the position of the source of a view of the venue.

32. The system of claim 31, wherein said user's different views include a composition of geographic referenced datasets, including at least imagery and virtual renderings.

33. The system of claim 31, wherein a view on said display includes a virtual rendering associated with a displayed participant.

34. The system of claim 31, wherein a view on said display includes a message associated with said displayed participant.

35. The system of claim 31, wherein a view on said display includes a message comprising an advertisement.

* * * * *